United States Patent
Hiruma

(10) Patent No.: US 8,285,445 B2
(45) Date of Patent: Oct. 9, 2012

(54) SYSTEM FOR PERFORMING COMMUNICATION BETWEEN DEVICES MOUNTED IN VEHICLE AND COMMUNICATION MODULE INCORPORATED IN THE SYSTEM

(75) Inventor: Atsuyuki Hiruma, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 218 days.

(21) Appl. No.: 12/765,136

(22) Filed: Apr. 22, 2010

(65) Prior Publication Data

US 2010/0274451 A1 Oct. 28, 2010

(30) Foreign Application Priority Data

Apr. 22, 2009 (JP) .................................. 2009-104208

(51) Int. Cl.
*G06F 7/00* (2006.01)
(52) U.S. Cl. ......................................................... 701/36
(58) Field of Classification Search .................... 701/22, 701/36, 48
See application file for complete search history.

(56) References Cited

U.S. PATENT DOCUMENTS

| 2009/0184833 A1 | 7/2009 | Tonegawa et al. |
| 2009/0267409 A1* | 10/2009 | Shima et al. ...................... 307/1 |
| 2011/0169448 A1* | 7/2011 | Ichikawa ...................... 320/109 |

FOREIGN PATENT DOCUMENTS

| JP | 2007-230520 | 9/2007 |
| JP | 2008-278740 | 11/2008 |

* cited by examiner

*Primary Examiner* — Kim T Nguyen
(74) *Attorney, Agent, or Firm* — Nixon & Vanderhye PC

(57) ABSTRACT

An electronic control unit and on-vehicle devices are each connected to a common power supply line via a communication module. The power supply line has positive and negative electrode side core wires. Each communication module is provided with a connection unit and a signal processor. The connection unit has a transformer having two pairs of input-output terminals, a first pair of which is respectively connected to the positive and negative electrode side core wires. The signal processor is connected to the second pair of input-output terminals of the transformer. The signal processor converts analog signals from the power supply line and outputted from the second pair of input-output terminals, converts externally inputted digital signals into analog signals and transmits the converted analog signals to the second pair of input-output terminals so that the converted analog signals are superimposed on the power supply line voltage.

18 Claims, 7 Drawing Sheets

SYSTEM FOR PERFORMING COMMUNICATION BETWEEN DEVICES MOUNTED IN VEHICLE AND COMMUNICATION MODULE INCORPORATED IN THE SYSTEM

CROSS REFERENCE TO RELATED APPLICATION

The present application relates to and incorporates by reference Japanese Patent application No. 2009-104208 filed on Apr. 22, 2009.

BACKGROUND

1. Technical Field

The present application relates to a system for performing communication between devices mounted in vehicle, and in particular, the system that uses a power line to perform the communication between an ECU (Electronic Control Unit) and each of on-vehicle devices such as an inverter, a compressor etc., which are mounted in vehicles including a hybrid vehicle and an electric vehicle.

The present application also relates to a communication module incorporated in the above system.

2. Description of the Related Art

In recent vehicles such as hybrid vehicles and electric vehicles, it is frequently required to reliably perform high-speed communication among on-vehicle devices for controlling behaviors of the vehicle.

Conventionally, when communicating between ECU and on-vehicle devices in a hybrid vehicle, the communication was performed by connecting target devices by communication lines of exclusive use. A composition example of the system for performing communication between devices mounted in vehicle is shown in FIG. 1. The system 10 for performing communication between devices mounted in vehicle shown in FIG. 1 includes an A/C-ECU 11 which performs air-conditioner control as ECU, an HV-ECU 13 which is connected to the A/C-ECU 11 by CAN (Controller Area Network)—through the GW (Gateway) device 12 which is connected by LIN (Local Interconnect Network) to the A/C-ECU 11 and performs signal conversion and an E/G-ECU 14 which performs engine control. However, the HV-ECU 13 performs the motor control for a hybrid vehicle, etc.

The system 10 for performing communication further includes a battery unit 21 which has a high-voltage battery 21a and supervises battery voltage of the high-voltage battery 21a, a DC/DC converter 22 which converts the high voltage of the high-voltage battery 21a in the battery unit 21 into 12V of the low voltage, a driving inverter 23 which performs drive control of a motor for hybrid, an electric compressor 24 which compresses a coolant of an air-conditioner, a pump 25, such as a cooling-water circulation pump and an oil pump and a fan 26, such as a battery cooling fan and a radiator fan. These on-vehicle devices 21-26 are connected by power supply line 27 shown with solid line.

Meanwhile, the HV-ECU 13 is connected to the battery unit 21, the DC/DC converter 22, the driving inverter 23, the electric compressor 24 and the pump 25 by communication lines 28 shown with dashed lines, and the E/G-ECU 14 and the fan 26 are also connected by communication lines 28, Thereby required communication is performed respectively.

An example of such conventional art of communication in a vehicle is disclosed, for example, in a Japanese Patent Application Laid-Open Publication No. 2007-230520.

However, in the above-mentioned conventional system for performing communication between devices mounted in vehicle, in order for ECU and each on-vehicle device to perform predetermined communication, communication lines of exclusive use are required. For this reason, there is a problem that troublesome work, such as drag, connection, etc. of communication lines, occurs, and as a result, work cost increases.

SUMMARY OF THE INVENTION

The present exemplary embodiment has been made in view of such conventional problems, and thus, it is an object of the present exemplary embodiment to provide a system for performing communication between devices mounted in vehicle which can reduce work cost of the wiring for predetermined communication between an ECU and each on-vehicle device.

In order to achieve the aforementioned object, the present exemplary embodiment provides a system for performing communication between devices mounted in vehicle which enables communication between an electronic control unit and different kinds of on-vehicle devices including a power line and a to communication module. The electronic control unit and each of the on-vehicle devices is connected to the power line, the power line is connected to a battery having a negative electrode and a positive electrode for power supply to the power line, the power line has a positive electrode side core wire connected to a positive electrode of the battery and a negative electrode side core wire connected to the negative electrode of the battery. The communication module is included in the electronic control unit and each of the on-vehicle devices, the communication module includes a connection unit and a signal processor. The connection unit has a transformer having two input-output terminals, wherein each of the positive electrode side core wire and the negative electrode side core wire is connected to one end of one of the input-output terminals of the transformer through a capacitor. The signal processor is connected to the other input-output terminal of the transformer, adapted to convert analog signals branched in the connection unit from voltage signals of the power supply line and outputted from the other input-output terminal, adapted to convert externally inputted digital signals into analog signals and adapted to transmit the converted analog signals to the other input-output terminal of the transformer so that the converted analog signals is allowed to be superimposed on the voltage signals of the power supply line in the connection unit.

In this configuration, the devices for vehicles include both the electronic control unit and the on-vehicle devices, and communication between the electronic control unit and different kinds of the on-vehicle devices includes not only communication between the electronic control unit and one of the on-vehicle devices but also communication between one of the on-vehicle devices and another one.

According to this configuration, in the electronic control unit and different kinds of the on-vehicle devices, the analog signals converted in the signal processor of the communication module are superimposed on the voltage signals of the power supply line in the connection unit, and, the analog signals superimposed on the voltage signals of the power supply line are branched in the connection unit then processed in the signal processor. If the analog signals are used as signals for communication, communication between the electronic control unit and different kinds of the on-vehicle devices may be possible using the power supply line which supplies power to the electronic control unit and different kinds of the on-vehicle devices. Therefore, since the conventional communication lines of exclusive use for communicating between the electronic control unit and different kinds of the on-vehicle devices becomes unnecessary, troublesome work, such as drag, connection, etc. of communication lines, becomes almost unnecessary whereby the work cost can be reduced sharply. Moreover, since the communication lines of exclusive use themselves are also unnecessary, material cost is also reducible.

It is preferable that the power supply line may have a grounded shield part, made of electrical conducting material, which insulatively covers the positive electrode side core wire, and the one input-output terminal of the transformer of the connection unit is connected to the shield part and the negative electrode side core wire of the power supply line through the capacitor.

According to this configuration, the analog signals for communication superimposed on the voltage signals are transmitted between the shield part and the negative electrode side core wire. However, no noise is generated in the shield part since the shield part is grounded, whereby noise can be removed from the analog signals transmitted through the power supply line.

It is also preferable that the power supply line may have a grounded shield part, made of electrical conducting material, in which the positive electrode side core wire and the negative electrode side core wire are paired up, and the shield part covers both the positive electrode side core wire and the negative electrode side core wire with insulating material, and the one input-output terminal of the transformer is connected to the shield part and the positive electrode side core wire of the power supply line through the capacitors.

As explained above, according to the present exemplary embodiment, a system for performing communication between devices mounted in vehicle which can reduce work cost of the wiring for predetermined communication between an ECU and each on-vehicle device can be provided.

According to a second aspect of the present exemplary embodiment, there is provided a communication module incorporated in a system for performing communication between devices mounted in vehicle, wherein the system enables communication between an electronic control unit and different kinds of on-vehicle devices, wherein the communication module is included in the electronic control unit and each of the on-vehicle devices, and the communication module includes a connection unit and a signal processor the connection unit having a transformer having two input-output terminals, wherein each of the positive electrode side core wire and the negative electrode side core wire is connected to one end of one of the input-output terminals of the transformer through a capacitor. The signal processor connected to the other input-output terminal of the transformer, adapted to convert analog signals branched in the connection unit from voltage signals of the power supply line and outputted from the other input-output terminal, adapted to convert externally inputted digital signals into analog signals and adapted to transmit the converted analog signals to the other input-output terminal of the transformer so that the converted analog signals is allowed to be superimposed on the voltage signals of the power supply line in the connection unit.

DETAILED DESCRIPTION OF PREFERRED EMBODIMENTS

Figure 1:
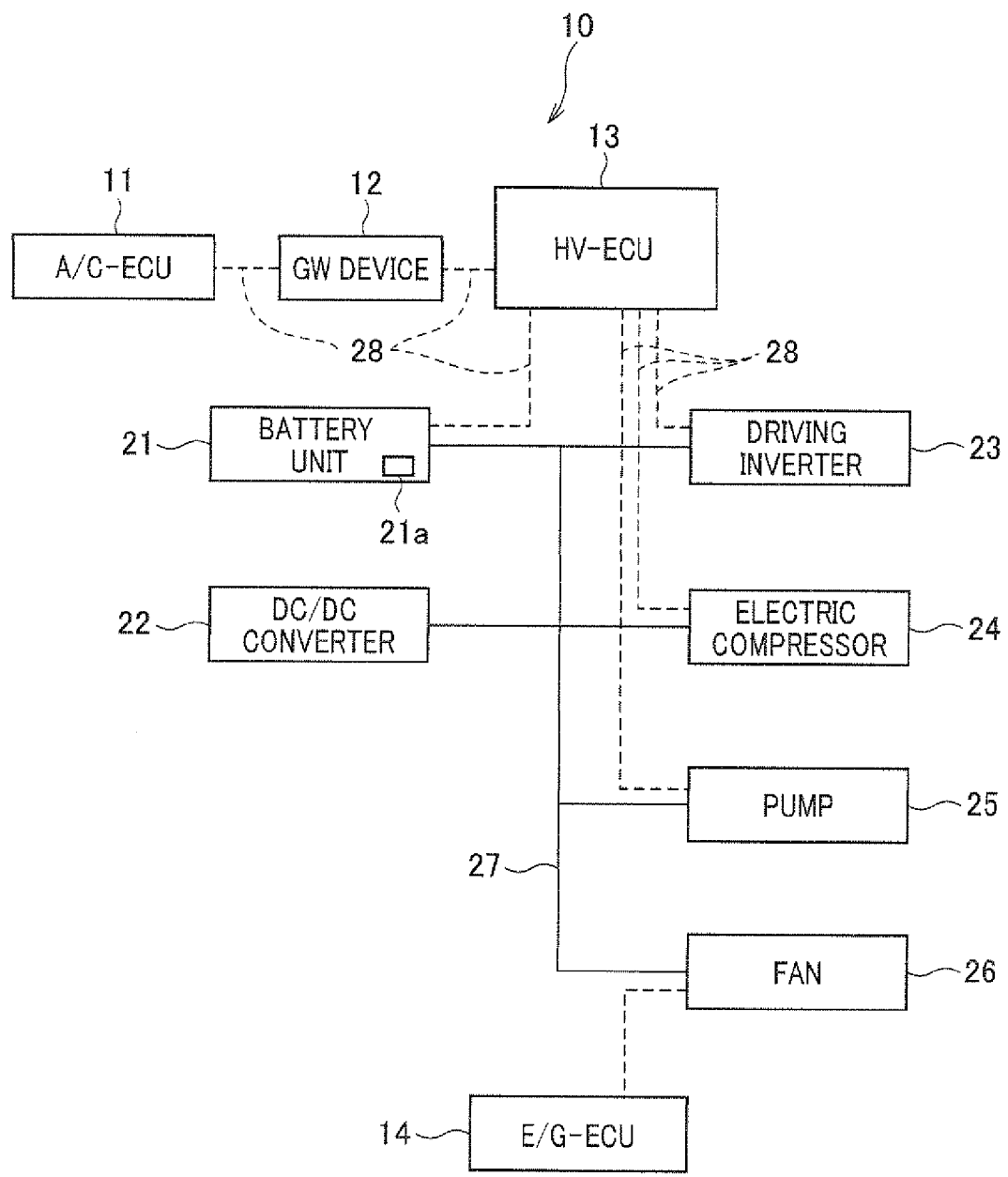
FIG. 1 is a block diagram showing the composition of the conventional system for performing communication between devices mounted in vehicle.

Hereinafter, a preferred embodiment of the present invention will be described referring to the drawings. In this description, the same reference symbols as those in FIG. 1 will be given in all drawings of this specification—for the sake of simplified explanations.

Figure 2:
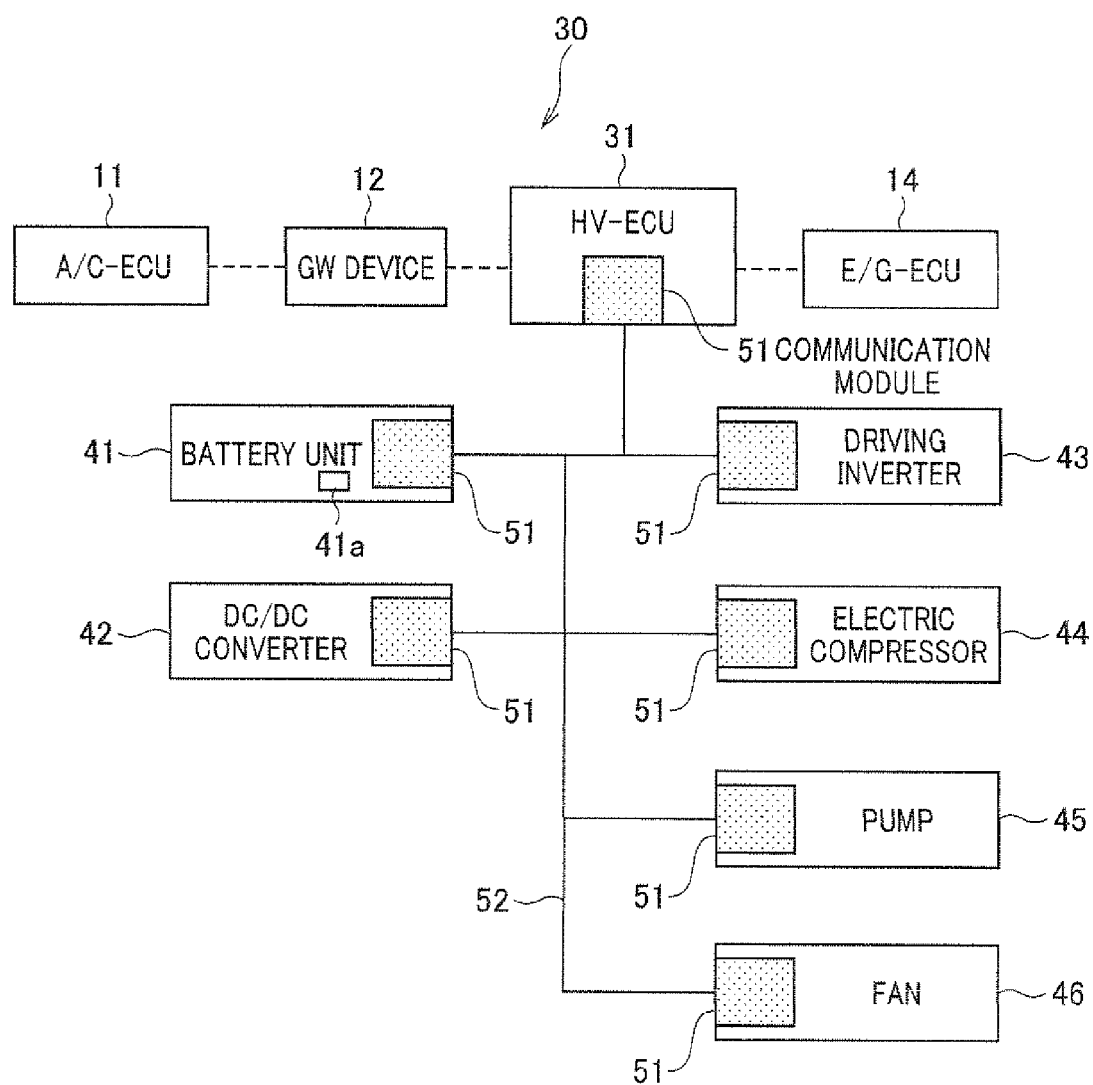
FIG. 2 is a block diagram showing the composition of the system for performing communication between devices mounted in vehicle according to an preferred embodiment of the present invention.

FIG. 2 is a block diagram showing a composition of the system for performing communication between devices mounted in vehicle according to the preferred embodiment of the present invention.

A system 30 for performing communication between devices mounted in vehicle shown in FIG. 2 is mounted for example, in a hybrid vehicle. The system 30 for performing communication between devices mounted in vehicle includes, as ECUs, an A/C-ECU 11 which controls an air-conditioner, a HV-ECU 31 connected by CAN to the A/C-ECU 11 through a GW device 12 which is connected to the A/C-ECU 11 by LIN and converts signals, and an E/G-ECU 14 which is connected to the HV-ECU 31 by CAN and controls an engine. The HV-ECU 31 and on-vehicle devices 41 to 46 are wired for communication by power supply line 52.

As the on-vehicle devices 41 to 46, the system 30 for performing communication between devices mounted in vehicle further includes a battery unit 41 which has a high-voltage battery 41a and supervises battery voltage of the high-voltage battery 41a, a DC/DC converter 42 which converts high voltage of the high-voltage battery 41a in the battery unit 41 into 12V of low voltage, a driving inverter 43 which performs drive control of a motor for hybrid, an electric compressor 44 which compresses a coolant of the air-conditioner, a pump 45, such as a cooling-water circulation pump and an oil pump, and a fan 46, such as a battery cooling fan and a radiator fan.

These on-vehicle devices 41 to 46 and the HV-ECU 31 are associated with communication modules 51 for performing required communication respectively. Each communication module 51 is connected to the power supply line 52 which connects the on-vehicle devices 41 to 46 and the HV-ECU 31.

Figure 3:
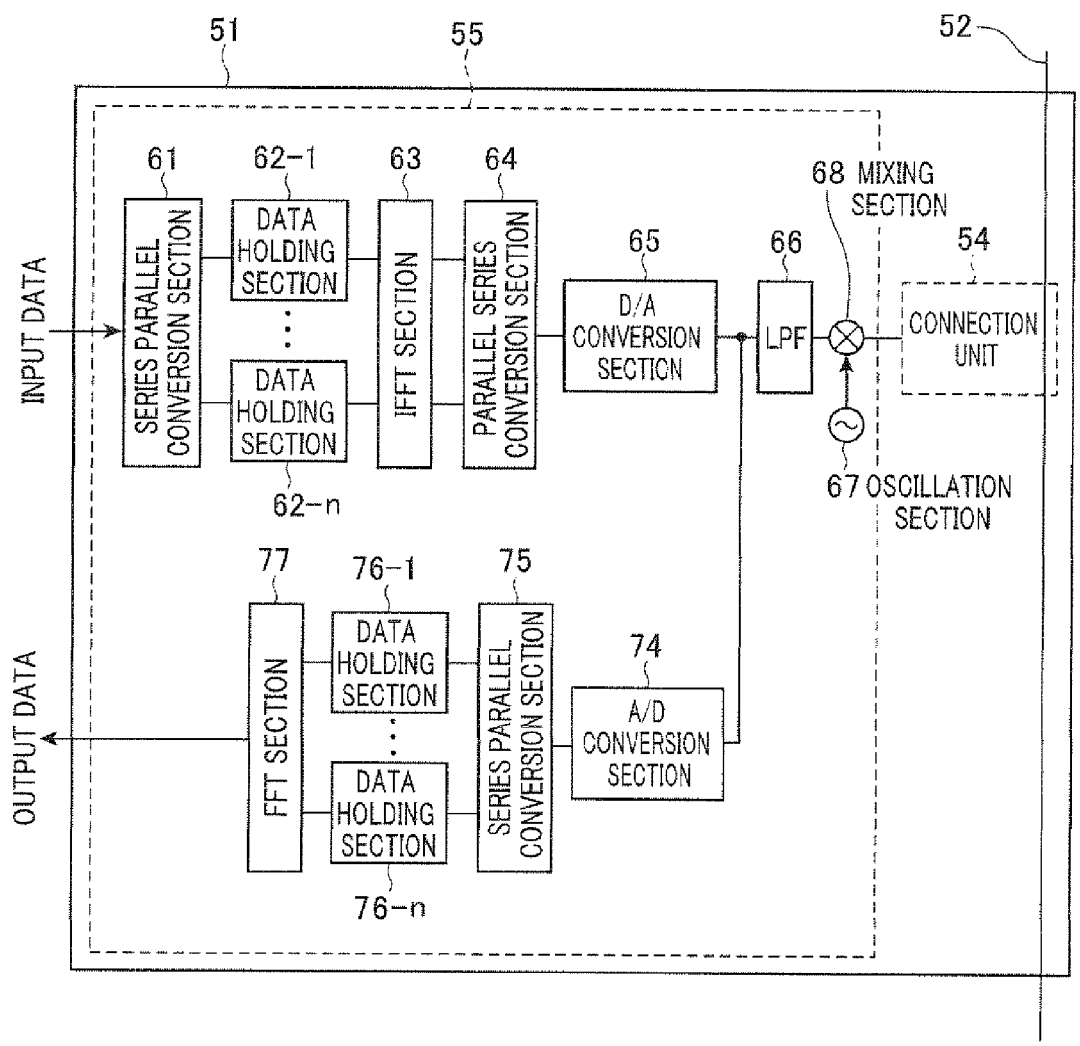
FIG. 3 is a block diagram showing the composition of the communication module of the system for performing communication between devices mounted in vehicle of the preferred embodiment.

As shown in FIG. 3, the communication module 51 includes a connection unit 54 which connects the communication module 51 to the power supply line 52, and a PLC (Power Line Communication) functional circuit 55 functioning as a signal-processor.

The PLC functional circuit 55 includes a series parallel conversion section 61 which converts into n parallel data series input data which were generated by any of the on-vehicle devices 41 to 46 and the HV-ECU 31, n data holding sections 62-1 to 62-$n$ which hold the converted parallel data temporarily, an IFFT (Inverse Fast Fourier Transform) section 63 which carries out inverse fast Fourier transform of the held parallel data. In addition, the PLC functional part 55 includes a parallel series conversion section 64 which converts into series data the parallel data by which inverse fast Fourier transform was carried out, a D/A (digital/analog) conversion section 65 which converts the series data into analog signals, an LPF (Low-Pass Filter) 66 which removes unnecessary harmonics components from the converted analog signals, an oscillation section 67 which oscillates local frequency signals, and a mixing section 68 which mixes the local frequency signals with the analog signals which passed the LPF 66, and converts the mixture into a predetermined frequency.

The analog signals converted into a predetermined frequency in the mixing section 68 are superimposed on voltage signals of the power supply line 52 in the connection unit 54 and transmitted. Here, if the power supply line 52 is for example, a high-voltage power supply line for a hybrid vehicle, analog signals are superimposed on the power supply line high-voltage of 288V, and are transmitted as superimposed waves.

The PLC functional circuit 55 further includes an A/D (analog/digital) conversion section 74 which converts into data the analog signals which are branched from the voltage signals of the power supply line 52 in the connection unit 54 and converted into the local frequency signals in the mixing section 68, further, whose unnecessary harmonics components are removed in the LPF 66, a series parallel conversion section 75 which converts the converted series data into n parallel data streams, n data holding sections 76-1 to 76-$n$ which hold the converted parallel data temporarily, and an FFT (Fast Fourier Transform) section 77 which carries out fast Fourier transform of the held parallel data. The data on which fast Fourier transform was carried out in the FFT section 77 are outputted to a control processor (not shown in FIG. 3).

Here, the PLC functional circuit 55 may have a functional composition which performs communication operation by a spectrum diffusion system other than the above-mentioned functional composition of operation.

Figure 4:
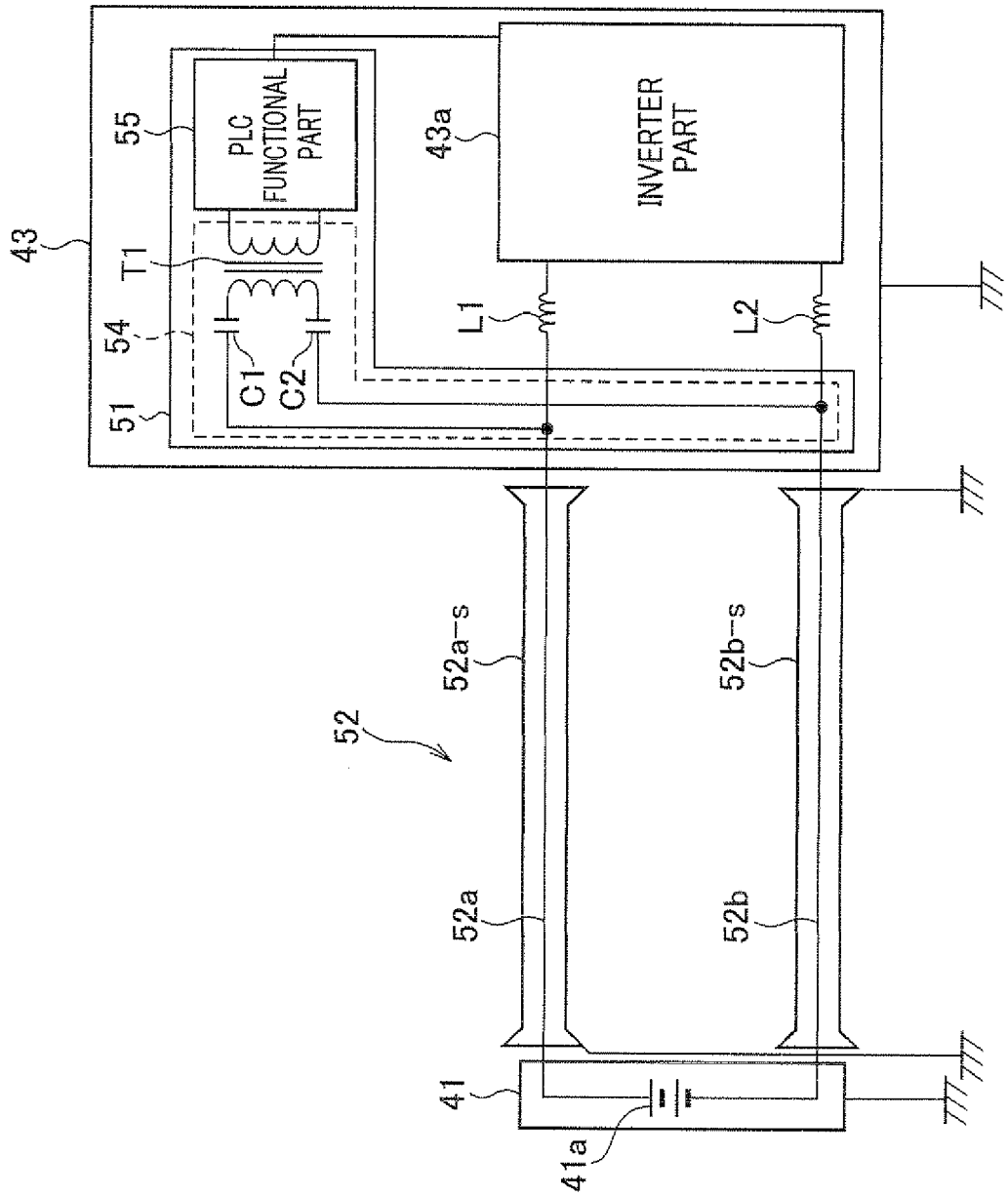
FIG. 4 shows a connection composition of the connection unit to the power supply line in the system for performing communication between devices mounted in vehicle of the preferred embodiment.

An example of the connection unit 54 is shown in FIG. 4. In the example, the communication module 51 is associated with the driving inverter 43 between the on-vehicle devices 41 to 46. An inverter part 43$a$, in the driving inverter 43, which performs drive control of a motor for hybrid vehicles, is connected to a positive electrode of a high-voltage battery 41$a$ for hybrid vehicles, for example, in the battery unit 41 by a positive electrode side core wire 52$a$ through a coil L1 for suppressing high frequency signal components. The inverter part 43$a$ is also connected to a negative electrode of the high-voltage battery 41$a$ for hybrid vehicles by a negative electrode side core wire 52$b$ through a coil L2 for high frequency suppression. Thereby the power can be supplied to the driving inverter 43.

The connection unit 54 includes capacitors C1 and C2 for blocking a direct-current component, and a transformer T1. One input-output terminal of the transformer T1 is connected to the positive electrode side core wire 52$a$ through the capacitor C1 and the negative electrode side core wire 52$b$ through the capacitor C2. The other input-output terminal of the transformer T1 is connected to the mixing section 68 (not shown in FIG. 4, see FIG. 3) of the PLC functional circuit 55.

That is, the connection unit 54 superimposes or branches analog signals for communication inputted and outputted to the PLC functional circuit 55 on or from voltage signals superimposed on the power supply line 52. Input data and output data of the PLC functional circuit 55 are exchanged with inverter part 43$a$.

The power supply line 52 includes a shield part 52$a$-$s$, made of electrical conducting material, which covers the positive electrode side core wire 52$a$ with insulating material, and a shield part 52$b$-$s$, made of electrical conducting material, which covers the negative electrode side core wire 52$b$ with insulating material. The shield part 52$b$-$s$ is grounded. Moreover, the case of the high-voltage battery 41$a$ for hybrid vehicles is also grounded.

In the system 30 for performing communication between devices mounted in vehicle of such composition, for example, digital signals of the inverter part 43$a$ of the driving inverter 43 shown in FIG. 4 are converted into analog signals of predetermined frequency in the PLC functional circuit 55 of the communication module 51, the analog signals are superimposed on voltage signals of the power supply line 52 in the connection unit 54, and the superimposed waves are transmitted to the HV-ECU 31.

When the superimposed waves transmitted from the communication module 51 of the HV-ECU 31 through the power supply line 52 are inputted into the connection unit 54 of the communication module 51 of the driving inverter 43, analog signals are branched from the superimposed waves in the connection unit 54, and the analog signals are inputted into the PLC functional circuit 55. The inputted analog signals are converted into digital signals in the PLC functional circuit 55, and then the digital data are inputted into the inverter part 43$a$.

Thus, according to the system 30 for performing communication between devices mounted in vehicles of the present embodiment, each of the HV-ECU 31 and different kinds of on-vehicle devices 41 to 46 includes a communication module 51 connected to power supply line 52, and they mutually communicate through communication modules 51. The power supply line 52 includes positive electrode side core wire 52$a$ connected to the positive electrode of the high-voltage battery 41$a$ for hybrid vehicles and negative electrode side core wire 52$b$ connected to the negative electrode of the high-voltage battery 41$a$ for hybrid vehicles. The communication module 51 includes connection unit 54 and PLC functional circuit 55. The connection unit 54 includes the transformer T1. One pair of input-output terminals of the transformer T1 are connected to the positive electrode side core wire 52$a$ and the negative electrode side core wire 52$b$ of power supply line 52 through capacitors C1 and C2, respectively. The power supply line 52 is connected for power supply to the HV-ECU 31 and the on-vehicle devices 41 to 46. The other pair of input-output terminals of the transformer T1 are connected to PLC functional circuit 55. The PLC functional circuit 55 converts the analog signals branched from the voltage signals of power supply line 52 in connection unit 54 and outputted from the other input-output terminals into digital signals. In parallel, PLC functional circuit 55 converts externally inputted digital signals into analog signals. Then PLC functional circuit 55 transmits converted analog signals to the other input-output terminals of the transformer T1 so that the converted analog signals may be superimposed on power supply line 52 in connection unit 54.

Accordingly, in the HV-ECU 31 and different kinds of on-vehicle devices 41 to 46, analog signals converted in PLC functional parts 55 of communication modules 51 are superimposed on power supply line 52 in connection units 54. The analog signals superimposed on power supply line 52 are branched in connection unit 54, and then processed in PLC functional circuit 55. If the analog signals are used as signals for communication, communication between HV-ECU 31 and different kinds of the on-vehicle devices 41 to 46 may be possible using power supply line 52 which supplies power to the HV-ECU 31 and different kinds of the on-vehicle devices 41 to 46.

Therefore, since the conventional communication lines of exclusive use for communicating between the HV-ECU 31 and different kinds of the on-vehicle devices 41 to 46 becomes unnecessary, troublesome work, such as drag, connection, etc. of communication lines, becomes almost unnecessary whereby the work cost can be reduced sharply. Moreover, since the communication lines of exclusive use themselves are also unnecessary, material cost is also reducible.

Figure 5:
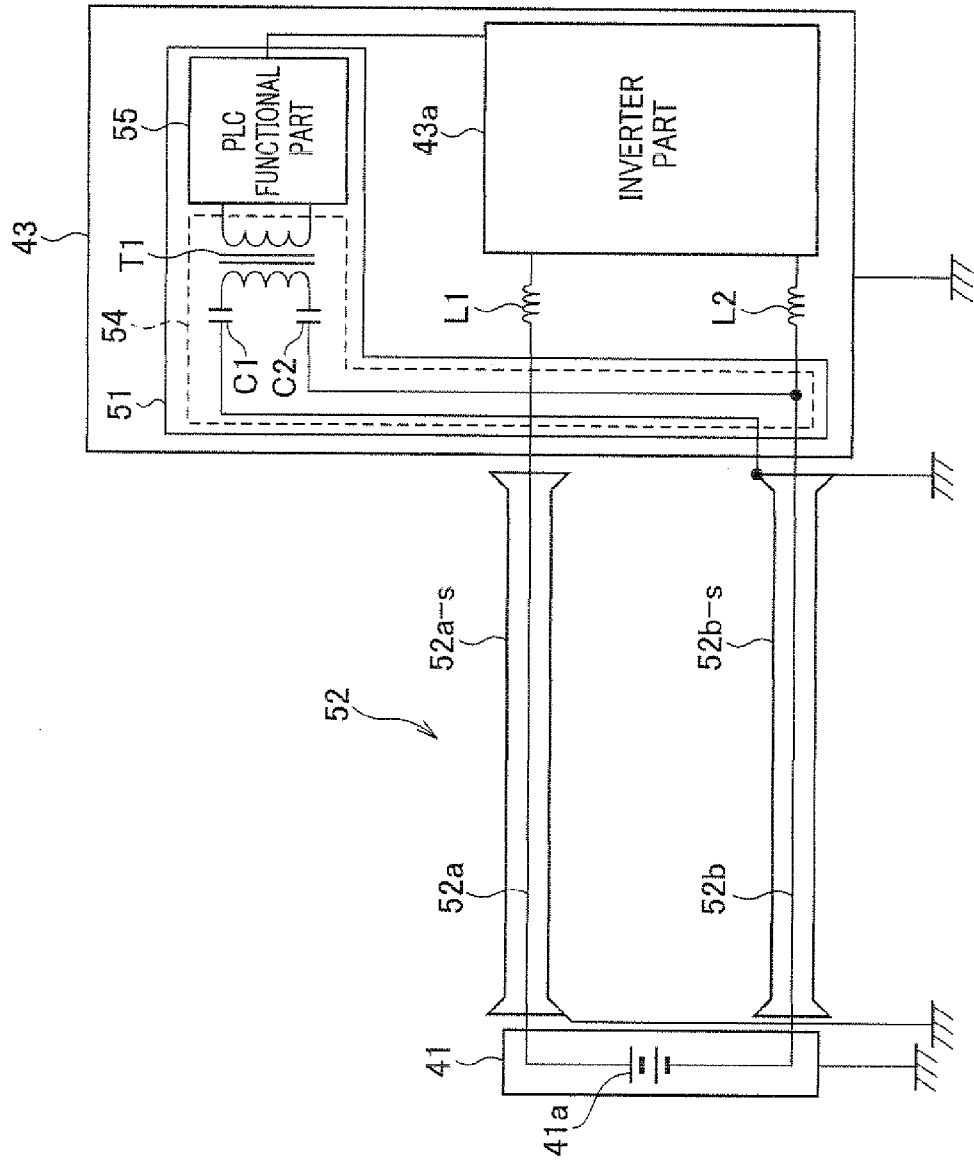
FIG. 5 shows another connection composition of the connection unit to the power supply line in the system for performing communication between devices mounted in vehicle of the preferred embodiment.

Alternatively, as shown in FIG. 5, the connection unit 54 may connect one input-output terminal of the transformer T1 to the grounded shield part 52*b-s*, made of electrical conducting material, of power supply line 52 through one capacitor C1, and to negative electrode side core wire 52*b* through the other capacitor C2.

In this case, although the analog signals for communication superimposed on the voltage signals are transmitted between negative electrode side core wire 52*b* and shield part 52*b-s*, no noise is generated in shield part 52*b-s* since shield part 52*b-s* is grounded, whereby noise can be removed from the analog signals transmitted through power supply line 52.

Figure 6:
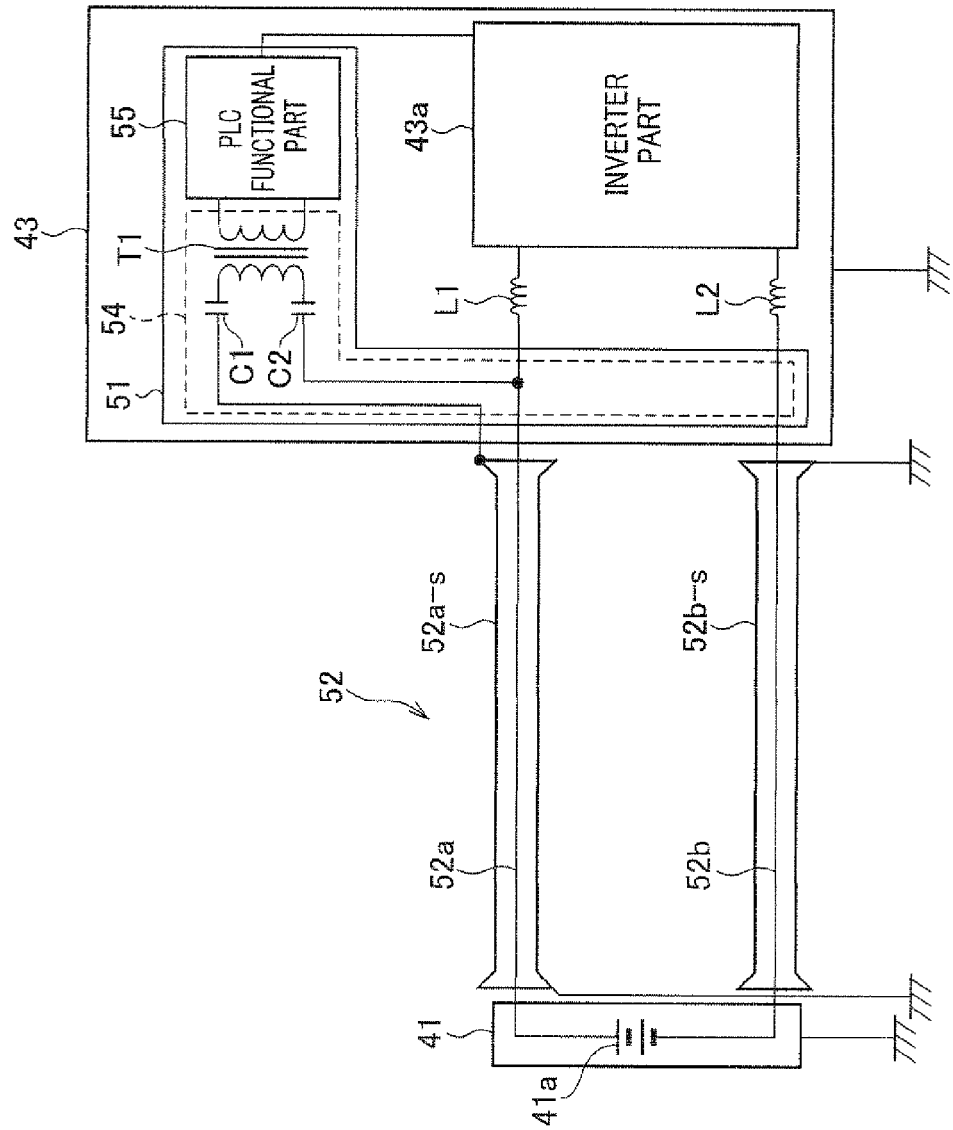
FIG. 6 shows an example of further connection composition of the connection unit to the power supply line in the system for performing communication between devices mounted in vehicle of the preferred embodiment.

A further alternative is shown in FIG. 6 where, in connection unit 54, the analog signals for communication are transmitted between positive electrode side core wire 52*a* and shield part 52*a-s*.

Figure 7:
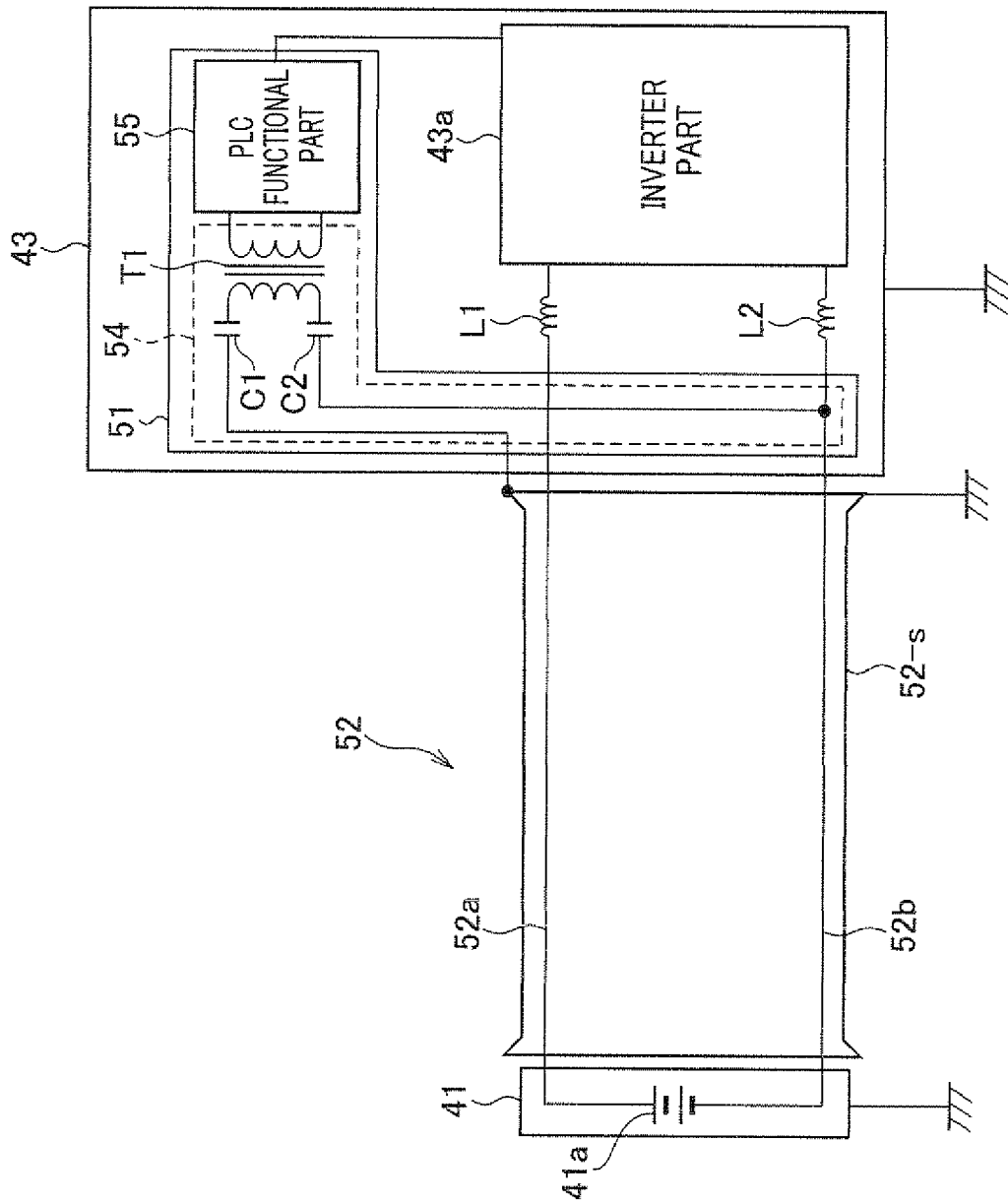
FIG. 7 shows an example of further connection composition of the connection unit to the power supply line in the system for performing communication between devices mounted in vehicle of the preferred embodiment.

Furthermore, although each of positive electrode side core wire 52*a* and negative electrode side core wire 52*b* are shielded by shield parts 52*a-s* and 52*b-s*, respectively, in the present embodiment, connection unit 54 is connectable to the power supply line by pairing up positive electrode side core wire 52*a* and negative electrode side core wire 52*b* and shielding the pair collectively with a shield part 52-*s* as well as the above. In this case, as shown in FIG. 7, connection unit 54 may be constituted so that the analog signals for communication are transmitted between positive electrode side core wire 52*a* and shield part 52-*s*. Alternatively, connection unit 54 may be constituted so that the analog signals for communication are transmitted between negative electrode side core wire 52*b* and shield part 52-*s*.

What is claimed is:

1. A system for performing communication between devices mounted in a vehicle which enables communication between an electronic control unit and different on-vehicle devices, said system comprising:
    a power line to which an electronic control unit and each of plural on-vehicle devices are connected, the power line being connected to a battery having a negative electrode and a positive electrode for power supply to the power line, the power line having a positive electrode side core wire connected to the positive electrode of the battery and a negative electrode side core wire connected to the negative electrode of the battery; and
    a communication module included in the electronic control unit and each of the on-vehicle devices, each communication module comprising:
        a connection unit transformer having two pairs of input-output terminals, wherein at least one of the positive electrode side core wire and the negative electrode side core wire is connected to a respective terminal of one pair of the input-output terminals of the transformer through a capacitor; and
        a signal processor connected to the other pair of input-output terminals of the transformer, adapted to convert analog signals from the power line and outputted from the other pair of input-output terminals, adapted to convert externally inputted digital signals into analog signals and adapted to transmit the converted analog signals to the other pair of input-output terminals of the transformer so that the converted analog signals are superimposed on the voltage of the power line in the connection unit.

2. The system for performing communication between devices mounted in a vehicle according to claim 1, wherein:
    the power line has a grounded shield part, made of electrical conducting material, which insulatively covers the negative electrode side core wire; and
    the one pair of input-output terminals of the transformer of the connection unit are respectively connected to the grounded shield part and to the negative electrode side core wire of the power line through a capacitor.

3. The system for performing communication between devices mounted in a vehicle according to claim 1, wherein:
    the power line has a grounded shield part, made of electrical conducting material, which insulatively covers the positive electrode side core wire with insulating material; and
    the one pair of input-output terminals of the transformer are respectively connected to the grounded shield part and to the positive electrode side core wire of the power line through a capacitor.

4. The system for performing communication between devices mounted in a vehicle according to claim 1, wherein:
    the power line has a grounded shield part, made of electrical conducting material, in which the positive electrode side core wire and the negative electrode side core wire are paired up, and a grounded shield part covers both the positive electrode side core wire and the negative electrode side core wire with insulating material; and
    the one pair of input-output terminals of the transformer are respectively connected to the grounded shield part and to the positive electrode side core wire of the power line through a capacitor.

5. The system for performing communication between devices mounted in a vehicle according to claim 1, wherein:
    the power line has a grounded shield part, made of electrical conducting material, in which the positive electrode side core wire and the negative electrode side core wire are paired up, and the grounded shield part covers both the positive electrode side core wire and the negative electrode side core wire with insulating material; and
    the one pair of input-output terminals of the transformer are respectively connected to the grounded shield part and to the negative electrode side core wire of the power line through a capacitor.

6. A system according to claim 1, wherein:
    said positive electrode side core wire and said negative electrode side core wire are each connected via a capacitor to a respectively corresponding terminal of said one pair of the transformer input-output terminals.

7. A communication module configured to be incorporated in a system for performing communication between devices mounted in a vehicle, wherein the system enables communication between an electronic control unit and different on-vehicle devices and the communication module is included in the electronic control unit and each of the on-vehicle devices, the communication module comprising:

a connection unit transformer having two pairs of input-output terminals, wherein at least one of a positive electrode side core wire and a negative electrode side core wire is connected to a respective one terminal of one pair of the input-output terminals of the transformer through a capacitor; and a signal processor connected to the other pair of input-output terminals of the transformer, adapted to convert analog signals from a power supply line and outputted from the other pair of input-output terminals, adapted to convert externally inputted digital signals into analog signals and adapted to transmit the converted analog signals to the other pair of input-output terminals of the transformer so that the converted analog signals are superimposed on the power supply line in the connection unit.

8. The communication module according to claim 7, wherein:

the power line has a grounded shield part, made of electrical conducting material, which insulatively covers the negative electrode side core wire; and the one pair of input-output terminals of the transformer of the connection unit are respectively connected to the grounded shield part and to the negative electrode side core wire of the power line through a capacitor.

9. The communication module according to claim 7, wherein:

the power line has a grounded shield part, made of electrical conducting material, which insulatively covers the positive electrode side core wire with insulating material; and the one pair of input-output terminals of the transformer are respectively connected to the grounded shield part and to the positive electrode side core wire of the power line through a capacitor.

10. The communication module according to claim 7, wherein:

the power line has a grounded shield part, made of electrical conducting material, in which the positive electrode side core wire and the negative electrode side core wire are paired up, and a grounded shield part covers both the positive electrode side core wire and the negative electrode side core wire with insulating material; and the one pair of input-output terminals of the transformer are respectively connected to the grounded shield part and to the positive electrode side core wire of the power line through a capacitor.

11. The communication module according to claim 7, wherein:

the power line has a grounded shield part, made of electrical conducting material, in which the positive electrode side core wire and the negative electrode side core wire are paired up, and the grounded shield part covers both the positive electrode side core wire and the negative electrode side core wire with insulating material; and the one pair of input-output terminals of the transformer are respectively connected to the grounded shield part and to the negative electrode side core wire of the power line through a capacitor.

12. The communication module according to claim 7, wherein:

said positive electrode side core wire and said negative electrode side core wire are each connected via a capacitor to a respectively corresponding terminal of said one pair of the transformer input-output terminals.

13. A method for performing communication between devices mounted in a vehicle which enables communication between an electronic control unit and different on-vehicle devices, said method comprising:

connecting a power line to an electronic control unit and each of plural on-vehicle devices, the power line being connected to a battery having a negative electrode and a positive electrode for power supply to the power line, the power line having a positive electrode side core wire connected to the positive electrode of the battery and a negative electrode side core wire connected to the negative electrode of the battery; and in the electronic control unit and each of the on-vehicle devices:

connecting at least one terminal of a first pair of unit transformer input-output terminals to at least one of the positive electrode side core wire and the negative electrode side core wire through a capacitor; and connecting a signal processor to a second pair of input-output terminals of the transformer, converting analog signals from the power line and outputted from the other pair of input-output terminals, and converting externally inputted digital signals into analog signals and transmitting the converted analog signals to the second pair of input-output terminals of the transformer so that the converted analog signals are superimposed on the voltage of the power line in the connection unit.

14. The method for performing communication between devices mounted in a vehicle according to claim 13, wherein:

the power line has a grounded shield part, made of electrical conducting material, which insulatively covers the negative electrode side core wire; and the first pair of input-output terminals of the transformer of the connection unit are respectively connected to the grounded shield part and to the negative electrode side core wire of the power line through a capacitor.

15. The method for performing communication between devices mounted in a vehicle according to claim 13, wherein:

the power line has a grounded shield part, made of electrical conducting material, which insulatively covers the positive electrode side core wire with insulating material; and the first pair of input-output terminals of the transformer are respectively connected to the grounded shield part and to the positive electrode side core wire of the power line through a capacitor.

16. The method for performing communication between devices mounted in a vehicle according to claim 13, wherein:

the power line has a grounded shield part, made of electrical conducting material, in which the positive electrode side core wire and the negative electrode side core wire are paired up, and a grounded shield part covers both the positive electrode side core wire and the negative electrode side core wire with insulating material; and the one pair of input-output terminals of the transformer are respectively connected to the grounded shield part and to the positive electrode side core wire of the power line through a capacitor.

17. The method for performing communication between devices mounted in a vehicle according to claim 13, wherein:
the power line has a grounded shield part, made of electrical conducting material, in which the positive electrode side core wire and the negative electrode side core wire are paired up, and the grounded shield part covers both the positive electrode side core wire and the negative electrode side core wire with insulating material; and
the first pair of input-output terminals of the transformer are respectively connected to the grounded shield part and to the negative electrode side core wire of the power line through a capacitor.

18. The method for performing communication between devices mounted in a vehicle according to claim 13, wherein:
said positive electrode side core wire and said negative electrode side core wire are each connected via a capacitor to a respectively corresponding terminal of said one pair of the transformer input-output terminals.

* * * * *